(12) United States Patent
Nguyen

(10) Patent No.: US 9,290,098 B2
(45) Date of Patent: Mar. 22, 2016

(54) ELECTRIC VEHICLES WITH EXTENDED RANGE

(76) Inventor: Tai Dung Nguyen, Fremont, CA (US)

( * ) Notice: Subject to any disclaimer, the term of this patent is extended or adjusted under 35 U.S.C. 154(b) by 822 days.

(21) Appl. No.: 13/296,196

(22) Filed: Nov. 14, 2011

(65) Prior Publication Data

US 2012/0123623 A1    May 17, 2012

Related U.S. Application Data

(60) Provisional application No. 61/413,480, filed on Nov. 15, 2010.

(51) Int. Cl.
| | |
|---|---|
| *B60L 11/00* | (2006.01) |
| *B60K 6/42* | (2007.10) |
| *B60L 11/12* | (2006.01) |
| *B60K 6/48* | (2007.10) |
| *B60L 1/00* | (2006.01) |
| *B60L 1/02* | (2006.01) |

(Continued)

(52) U.S. Cl.
CPC ............... *B60L 11/126* (2013.01); *B60K 6/48* (2013.01); *B60K 20/02* (2013.01); *B60L 1/003* (2013.01); *B60L 1/02* (2013.01); *B60L 1/14* (2013.01); *B60L 3/102* (2013.01); *B60L 8/003* (2013.01); *B60L 8/006* (2013.01); *B60L 11/14* (2013.01); *B60L 11/1816* (2013.01); *B60W 30/182* (2013.01); *B60W 50/082* (2013.01); *B60L 2240/622* (2013.01); *B60L 2260/28* (2013.01); *Y02T 10/6217* (2013.01); *Y02T 10/6221* (2013.01); *Y02T 10/7005* (2013.01); *Y02T 10/7077* (2013.01); *Y02T 10/7083* (2013.01); *Y02T 10/7094* (2013.01); *Y02T 10/7291* (2013.01); *Y02T 90/14* (2013.01); *Y02T 90/16* (2013.01); *Y02T 90/162* (2013.01); *Y10T 74/19051* (2015.01); *Y10T 74/20012* (2015.01)

(58) Field of Classification Search
CPC .............. B60K 6/20; B60K 6/38; B60K 6/42; B60W 2510/244; B60W 20/00; B60W 20/20; B60W 20/40; B60L 11/123; B60L 11/126; B60L 11/1862; Y02T 10/6213; Y02T 10/6286
USPC ......... 701/22, 48; 74/665 R, 665 A; 903/903; 180/65.275, 65.21, 65.23
See application file for complete search history.

(56) References Cited

U.S. PATENT DOCUMENTS

| | | | | |
|---|---|---|---|---|
| 4,511,012 | A | * | 4/1985 | Rauneker .................. 180/65.25 |
| 5,264,764 | A | | 11/1993 | Kuang |

(Continued)

FOREIGN PATENT DOCUMENTS

JP     2003 061210     2/2003

OTHER PUBLICATIONS

Huffman, John Pearley, "GEM E825", Aug. 2002, Car and Driver.*

(Continued)

*Primary Examiner* — Spencer Patton

(57) ABSTRACT

The present invention discloses electric vehicles and methods to operate such vehicles, comprising an electric drive capable of moving the vehicles, together with a non-battery operative feature to enhance the performance of the vehicle, such as extending the range or increasing the power. The non-electrical enhanced feature is independent and not integrated with the electric drive, to enable the return of the vehicle design to pure electrical power with minimum modification.

20 Claims, 8 Drawing Sheets

(51) Int. Cl.
  *B60L 1/14*   (2006.01)
  *B60L 3/10*   (2006.01)
  *B60L 8/00*   (2006.01)
  *B60L 11/14*  (2006.01)
  *B60L 11/18*  (2006.01)
  *B60W 50/08*  (2012.01)
  *B60K 20/02*  (2006.01)
  *B60W 30/182* (2012.01)

(56) References Cited

U.S. PATENT DOCUMENTS 5,318,142 A * 6/1994 Bates et al. ............. 180/65.245
2003/0085063 A1   5/2003 Wakitani
2010/0072953 A1 * 3/2010 Mitsutani .................. 320/152
2010/0084211 A1   4/2010 Seidel
2010/0109445 A1 * 5/2010 Kurs et al. ................ 307/104
2010/0213887 A1 * 8/2010 Louch et al. .............. 320/101
2011/0031051 A1   2/2011 George
2011/0277467 A1 * 11/2011 Dravis ..................... 60/605.1

OTHER PUBLICATIONS

Honda GX 100 Owner's Manual.*
PCT preliminary report on patentability—PCT/US2011/060885—dated May 21, 2013.

* cited by examiner

ELECTRIC VEHICLES WITH EXTENDED RANGE

This application claims priority from provisional application Ser. No. 61/413,480, filing date Nov. 15, 2010, entitled "Electric vehicles with extended range".

The invention relates to electric vehicles that are driven by an electric drive, and methods of controlling the vehicles.

Conventional vehicles, such as passenger cars or automobiles, Sports Utility Vehicles (SUV), trucks use fossil-fuel powering an internal combustion engine. Fuel cost and environmental concern for this type of engine have promoted a need for alternatives.

FIG. 1A illustrates a schematic of a vehicle with an internal combustion engine drive system. The drive system typically includes an engine 13 coupled to a transmission 12 to drive the vehicle axle 10. A fuel tank 14 provides fuel, such as gasoline or diesel, to the engine 13. As shown, the vehicle is a two wheel drive, with the other axle 11 not actively powered. The vehicle can be front-wheel drive or rear-wheel drive. There are other configurations of vehicle architectures, such as four-wheel drive configurations.

Currently, there is pressing concern that oil supply will soon be not adequate to meet the rising demands of energy consumption. In addition, there are serious environmental issues, such as green house emission, associated with internal combustion engines employing gasoline or diesel.

Electric vehicles have gained popularity in recent years as the potential replacement for internal combustion vehicles, since they promise zero emission from electric drive system, and a break away from oil dependency.

FIG. 1B illustrates a schematic of a vehicle with an electric drive system. The drive system typically includes an electrical motor 26 coupled to a transmission 25 to drive the vehicle axle 21. A battery 27 provides electrical power to the motor 26. As shown, the motor powers a two wheel axle, with the other axle 20 not actively powered. The electric motor can power one axle, two axles, or individual wheels.

At the present time, battery and motor technology presents a major drawback for electric vehicles, which translates to lower power and short range. A common problem is the weight and cost of the batteries, which is large and heavy. Furthermore, the capacity of the battery degrades with successive charging cycles. For example, the range of the electric vehicle is generally proportional to the amount of electrical energy stored in the battery. But battery power density is low, and thus the battery contributes significant weight and mass to the electric vehicle, and thus affects the available range and performance of the electric vehicle.

A temporary solution to the shortcoming of battery technology is a combination of electric power and combustion engine, which reduces the fuel consumption, increases the power, and extends the range of the electrical motor. For example, an alternate fuel vehicle employs an integration of a diesel or gas powered engine and an electric motor. Engine can be used to drive the vehicle, or as a source to charge the battery for the electric power. Other sources can also be employed to charge the batteries including solar, wind, hydraulic, compressed air, bio energy sources.

FIG. 1C illustrates a vehicle having a combination of electrical motor and combustion engine. The vehicle includes an engine 33 coupled to a gas tank 34, a motor 36 coupled to battery 37, and a power splitting mechanism 38 to allow the engine 33 and the motor 36 to drive the axle 30. These types of vehicles have improved performance, but they deviate from the path of electric vehicles, e.g., it is difficult to return to pure electric vehicles from these designs.

Therefore, it would be ideal to create an electric vehicle that has improved performance and at the same time, prepares the path to future electric vehicle generations when better battery technology and electric motors are available.

DETAILED DESCRIPTION OF THE PREFERRED EMBODIMENTS

The present invention discloses electric vehicles and methods to operate such vehicles. The electric vehicle comprises an electric drive capable of moving the vehicles, together with a non-electrical feature to enhance the performance of the vehicle, such as extending the range or increasing the power. In the present description, "electrical" sometimes means "battery", and "non-electrical" sometimes means "non-battery". The electric drive is powered by the battery, and the non-electrical feature is powered by non-electrical power (or non-battery power), such as by natural gas, gasoline or diesel, compressed air, solar panel, or other power sources. The non-electrical enhanced feature is independent and not integrated with the electric drive, to enable the return of the vehicle design to pure electrical power with minimum modification. In some embodiments, the non-electrical feature is only coupled with the electric drive at the start-stop level, such as a manual or automatic switch that turns on or off the enhanced feature, so that the enhanced feature can operate in addition, or in replacement, of the electric drive.

In some embodiments, the non-electrical enhanced feature comprises at least one of a non-electric drive coupled to a free (e.g., an axle that is not powered by the electric drive) axle of the electric vehicle; a generator coupled to a free axle for charging the battery; a non-electrical generator for charging the battery; and non-electrical system providing support function, such as an air conditioner, a vehicle fan, a vehicle heater, electronic components or devices, or a lighting subsystem operated by solar panel, by compress air, by gasoline or diesel, or by natural gas. The non-electrical generator and/or support system can also be coupled to the non-electric drive. As stated above, non-electrical can include solar power, thus electrical means battery in some embodiments of the present invention.

Figure 1A:
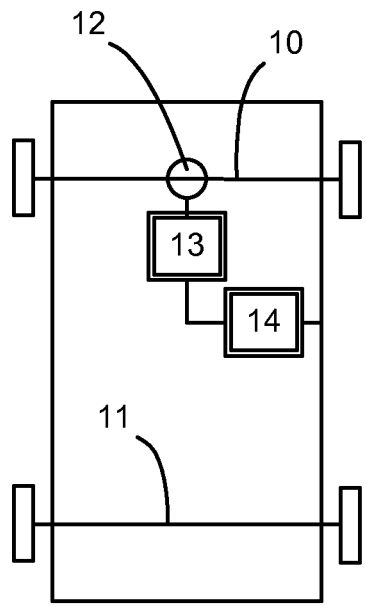
FIG. 1A illustrates a schematic of a vehicle with an internal combustion engine drive system.
Figure 1B:
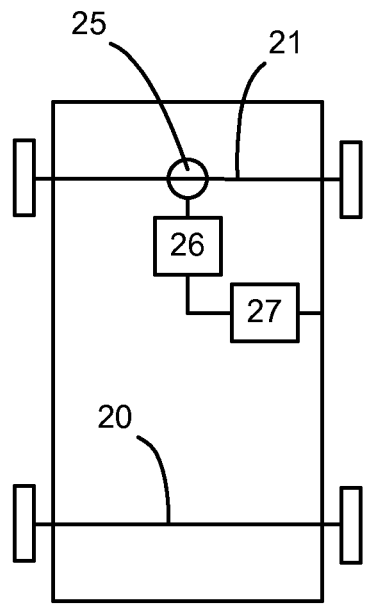
FIG. 1B illustrates a schematic of a vehicle with an electric drive system.
Figure 1C:
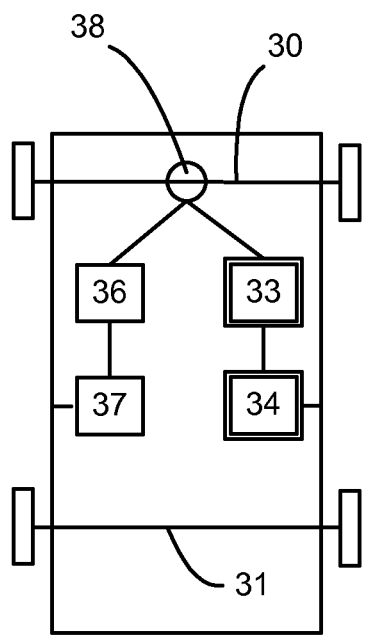
FIG. 1C illustrates a vehicle having a combination of electrical motor and combustion engine.
Figure 2:
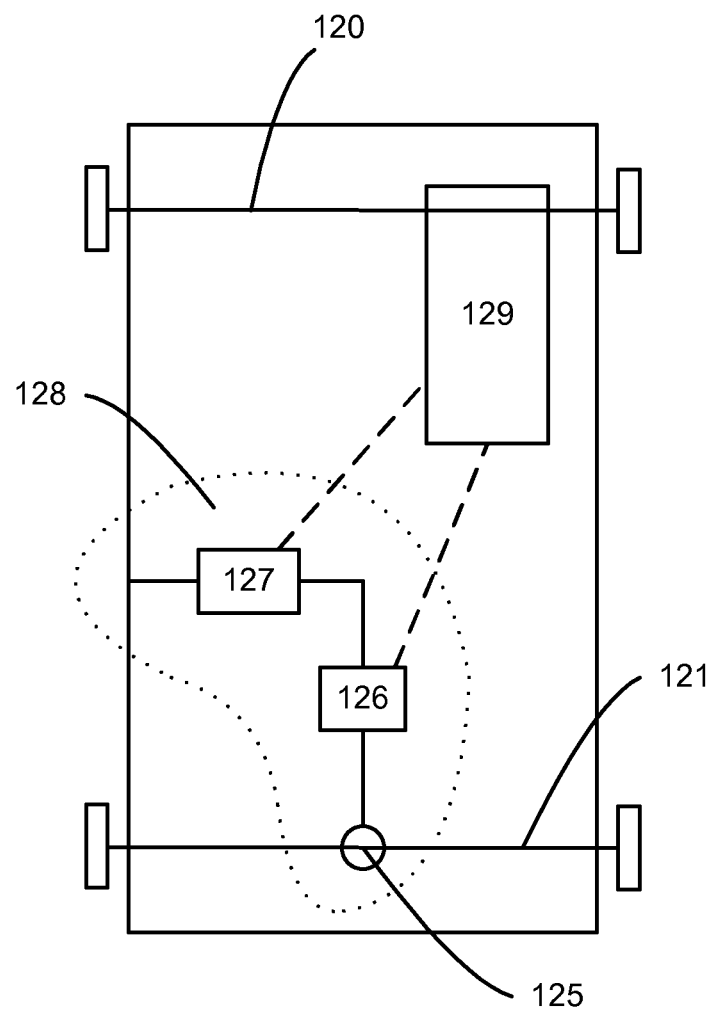
FIG. 2 illustrates an exemplary schematic configuration of an electric vehicle according to some embodiments of the present invention.

FIG. 2 illustrates an exemplary schematic configuration of an electric vehicle according to some embodiments of the present invention. The electric vehicle comprises an electric drive system 128, for example, an electrical motor 126 coupled to a gearbox 125 to drive the vehicle axle 121. A battery 127 provides electrical power to the motor 126. As shown, the electric motor 126 powers a two wheel axle (e.g., front or back axle), but other electric drive systems are also within the scope of the present invention, such as electric drive operating multiple axles, or operating individual wheels (e.g., one, two, three, four, or more wheels). For example, an electrical motor can operate one wheel of a three-wheel vehicle, or two electrical motors can operate two or more wheels of a four-wheel vehicle. The term "electrical", in this context, means "battery". Alternatively, the electric drive system can use other form of electrical power, such as solar panel, or a combination of solar and battery.

The electric drive system can be a main drive for the vehicle, using a motor or a motor/generator assembly coupled to the axle through direct drive, gear box or clutch. The battery system provides power to the electric drive. The electric vehicle can have power management to conserve battery power, controller to maintain proper current to the motor, capacitors to regulate or trickle charge the battery power, and other components such as regenerative brake, generator for battery recharge or plug-in battery recharger.

The electric vehicle further comprises a non-electrical powered assembly 129 to enhance the performance of the electric vehicle without interfering with the independent operation of the vehicle. For example, the assembly 129 can comprise a non-electrical powered drive coupled to the free axle 120 to operate the vehicle, for example, when the electric drive does not operate. The assembly can comprise a non-electrical power generator to charge the battery, thus extending the range of the electric vehicle. The assembly 129 can comprise a non-electrical powered support system, such as a compress-air powered air conditioner, to reduce the power consumption of the battery, thus not affecting the range of the vehicle with supporting usages. The support system can comprise vehicle fan, vehicle lighting (head lights, tail lights, emergency lights, etc.), vehicle heater, electronic components (radio, global positioning system, compact disk player, telephone), etc.

The non-electrical assembly can be coupled to an axle, for example, axle 120, to either drive the vehicle or to receive rotational power from the rotated axle 120. The non-electrical assembly can be not coupled to any axle, stationed within the vehicle without attaching to any axle. For example, the non-electrical assembly can provide support usage to the vehicle, e.g., usage non related to driving the vehicle.

The non-electrical assembly can receive power from non-battery source, such as compressed air, natural gas, gasoline, diesel, solar panel, etc. In general, the term non-electrical used in the present invention can include non-battery (such as solar power), in addition to non-electrical current.

In general, the non-electrical assembly 129 can extend the range of the vehicle without interfering with the operation of the electric drive system, allowing the incorporation of advanced developments in electric vehicles, such as better motor or better battery with minimum changes. With the assembly 129 not integrated with the electric drive, removing the assembly 129 or upgrading the electric drive system is a simple task and can be performed without affecting the electric vehicle operation. In some embodiments, the electric drive system is the main power for the electric vehicle, offering a fully electric vehicle system with the non-electrical assembly serving as a back up system, generally operating only when needed.

Figure 3A:
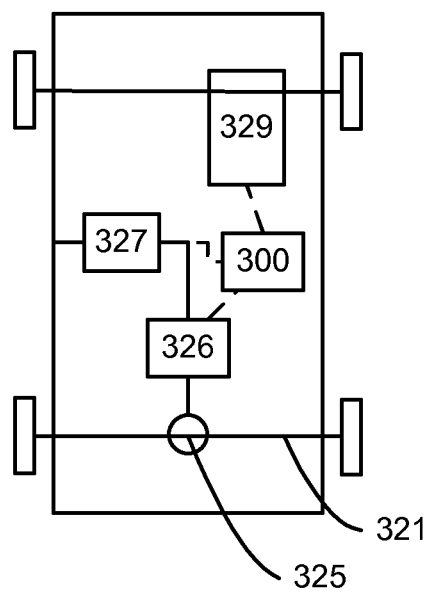
FIGS. 3A-3C illustrate exemplary configurations for the electric drive system according to some embodiments of the present invention.
Figure 3B:
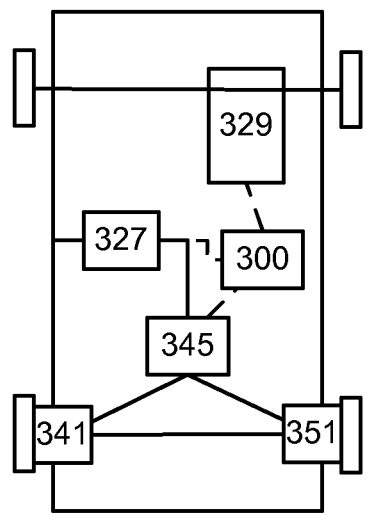
Figure 3C:
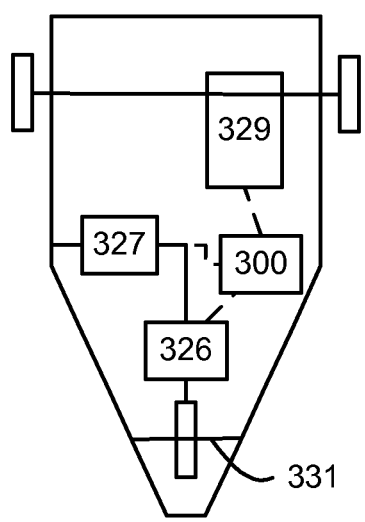

FIGS. 3A-3C illustrate exemplary configurations for the electric drive system according to some embodiments of the present invention. FIG. 3A shows a four-wheel two-axle vehicle having an electric drive system coupled to one axle 321, either the front or the back axle. The electric drive system comprises battery 327 powering a motor 326, which is coupled to the axle 321 through gear system 325. A controller 300 couples to the battery 327 and the motor 326 to start, stop and in general, to control the power to be applied to the motor. A non-electrical assembly 329 is supplied to improve the performance of the electric vehicle, such as for extending the range of the vehicle. The assembly 329 can be totally separated from the electric drive system or only coupled to the controller 300 in order not to interfere with the main power drive of the electric drive.

FIG. 3B shows a vehicle having electrical motors 341/351 coupled to two wheels of the vehicle. A synchronizer 345 is included to control the power applied to the two motors in order to prevent slippage. The wheels can be arranged in pairs, e.g., forming an axle, with a gearbox to allow the motor to drive both wheels together. The gearbox can include speed change gearing, differential gearing, transfer case gearing, drive shafts, constant velocity joints, and any other components.

A vehicle may alternatively include a single wheel at one of the front or rear ends of the vehicle. FIG. 3C shows a three-wheel vehicle having an electric drive system coupled to a single wheel 331. Other configurations can also be used, for example, electrical motor coupled to a wheel in three-wheel vehicles, or vehicles with three or more axles.

The present electric vehicle further comprises a non-electrical powered assembly (including non-battery powered assembly) to enhance the performance of the electric vehicle without interfering with the independent operation of the vehicle. In some embodiments, the assembly comprises a non-electrical powered drive coupled to the free axle (e.g., axle not connected to the electric drive) to operate the vehicle in a preferably mutually exclusive mode with the electrical powered drive system. The non-electrical powered drive operates independently and is coupled to the electric drive by a manual or semi-automatic switch that allows only the operation of either the electric drive or the non-electric drive. This assembly feature can provide a range extending feature to the electric vehicle, e.g., allowing the electrical vehicle to switch to non-electrical powered drive when running out of battery power, or to charge the battery with the non-electrical powered drive while running. The configuration also provides the simplicity of the electric vehicle design, with the electric drive and the non-electric drive decoupled from each other. Switching from one drive to another drive can be performed by a manual switch, operated by a driver whenever desired. Switching can also be performed semi-automatically, for example, when the battery is running out to keep the vehicle operating continuously. In some embodiments, during the operation of the non-electric drive, the battery can be charged, for example, through the motor operated as a generator, through an additional generator coupled to the non-electric drive or to the driving axle.

One advantage of the present invention is the independent electric drive, e.g., the non-electrical portion is not intimately integrated with the electric drive. This feature can allow upgrading the electric drive by replacing appropriate components, e.g., replacing the electric motor with more power and better efficiency models, replacing the battery assembly with higher capacity models, etc. The present invention realizes the non-maturity of the electric vehicle, and thus offers models to allow ease of upgrading.

Figure 4:
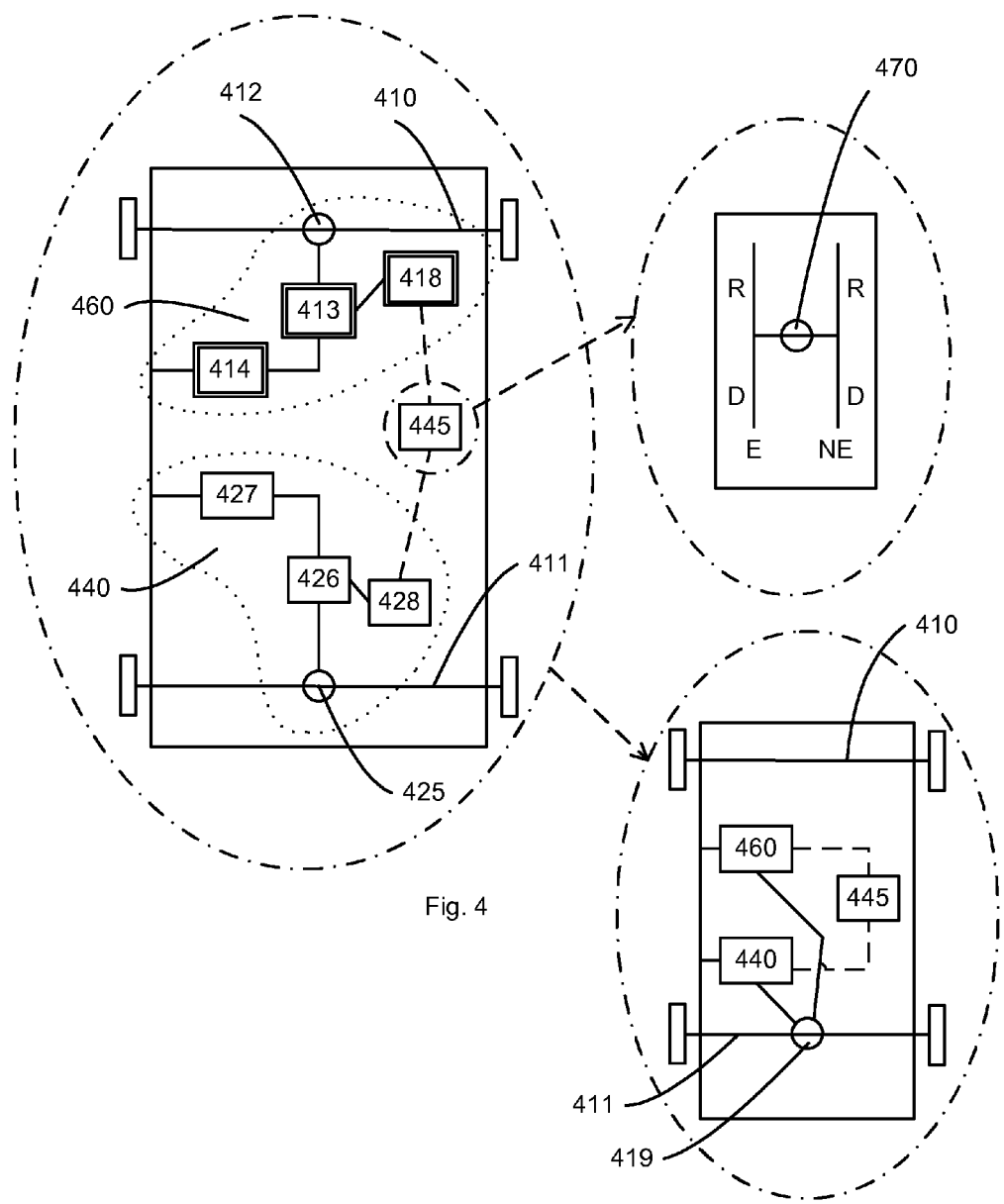
FIG. 4 illustrates an exemplary electric vehicle according to some embodiments of the present invention.

FIG. 4 illustrates an exemplary electric vehicle according to some embodiments of the present invention. The vehicle comprises an electric drive system 440 coupled to axle 411 to operate the vehicle. In some embodiments, the electric drive system comprises a battery 427 powering a motor 426, which is coupled to gearbox 425 to drive axle 411. An optional controller 428 is coupled to the motor 426 to control the motor, such as providing more power when needing high acceleration, or to regulate the power to the motor to optimize the consumption of electrical power from the battery. As shown, the electric drive system 440 represents an exemplary electric drive system. Other electric drive systems can also be used, such as motor-on-wheel and battery management system.

In some embodiments, the electric vehicle comprises a non-electric (included non-battery) drive assembly 460, which comprises a non-electric power train. The non-electric drive assembly 460 comprises a non-electric engine, for example, an internal combustion engine 413, powered by a power source, for example, a gasoline tank 414, and coupled to a gearbox 412 to drive the axle 410. The non-electric drive assembly 460 can comprise an optional controller 418 coupled to the engine 413 to control, monitor, and optimize power consumption. The non-electric drive assembly 460 can drive the axle 410 independent of the electric drive system 440 driving the other axle 411. In some embodiments, the non-electric drive assembly 460 can drive the axle 411, for example, by sharing a gear box 419 with the electric drive assembly, or by a separate coupling with the axle 411. For example, the drive systems 440 and 460 drive the axle 411 of the electric vehicle through a mutually exclusive gearbox 419. In some embodiments, the electric drive assembly and the non-electric drive assembly are independently operated, thus if sharing an axle, one drive is decoupled from that axle so that the other drive can operate.

In some embodiments, the non-electric engine comprises a motor powered by a solar panel, an engine powered by natural gas, or an engine powered by compressed air.

A vehicle controller 445 coupled to the electric drive system 440 and the non-electric drive assembly 460, for example, to control both drive systems. The two drive systems are separate and operate independent of each other, with only the controller 445 connecting the two systems. Thus any non-electric drive technology can be used without any modification. In addition, the electric drive system can also be easily upgraded with advanced electric drive technology, such as better battery or better motor. The present electric vehicle is ready for today technology, ready to incorporate better electric power technology, and employing current non-electric power technology without any needless modifications.

In some embodiments, the controller 445 allows a mutually exclusive operation of the electric and non-electric power drives, e.g., only one drive operates the vehicle at any one time. This exclusiveness allows a simple control of both drives, for example, when the control 470 is moved to the electric drive E, the electric drive system is engaged (or turned on), and the non-electric drive system is disengaged (or turned off). Conversely, when the control 470 is moved to the non-electric drive NE, the electric drive system is disengaged (or turned off), and the non-electric drive system is engaged (or turned on). Short start up time for electric drive may mean instantaneous power when turned on, so for electric power, engaging and disengaging could mean powering on and powering off. For non-electric power, disengaging might mean an idle position, where the drive is turned on but not engaged.

In some embodiments, the controller 445 is a manual controller, under the exclusive control of the driver. The manual controller offers great control to the driver without or with minimum loss of control. For example, the driver knows when to stop the electric drive, and when to start the non-electric drive. Sensors could help to inform the driver of the conditions of the vehicle, such as the level of battery, and how far can the vehicle travel under electric power. Power conservation could be best performed by the driver, instead of an automatic controller. In some embodiments, the controller 445 can have a partially automatic mode, for example, by automatically switching to non-electric power when the electric power is depleted.

Figure 5A:
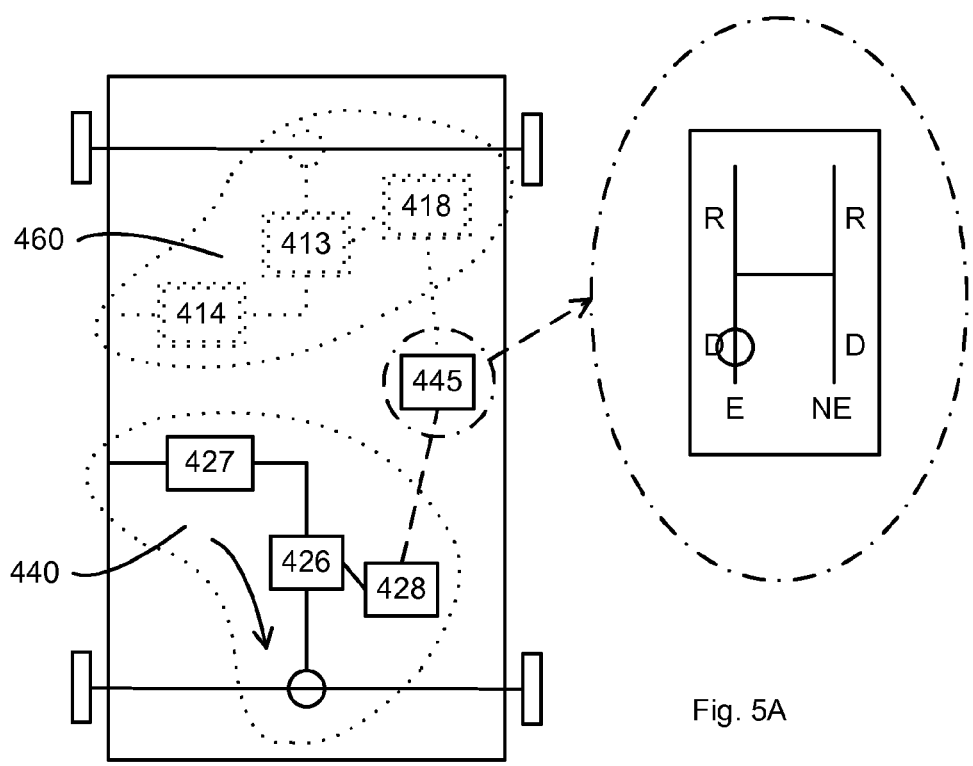
FIGS. 5A-5B illustrates two exclusive modes of operation for the present electric vehicle according to some embodiments of the present invention.
Figure 5B:
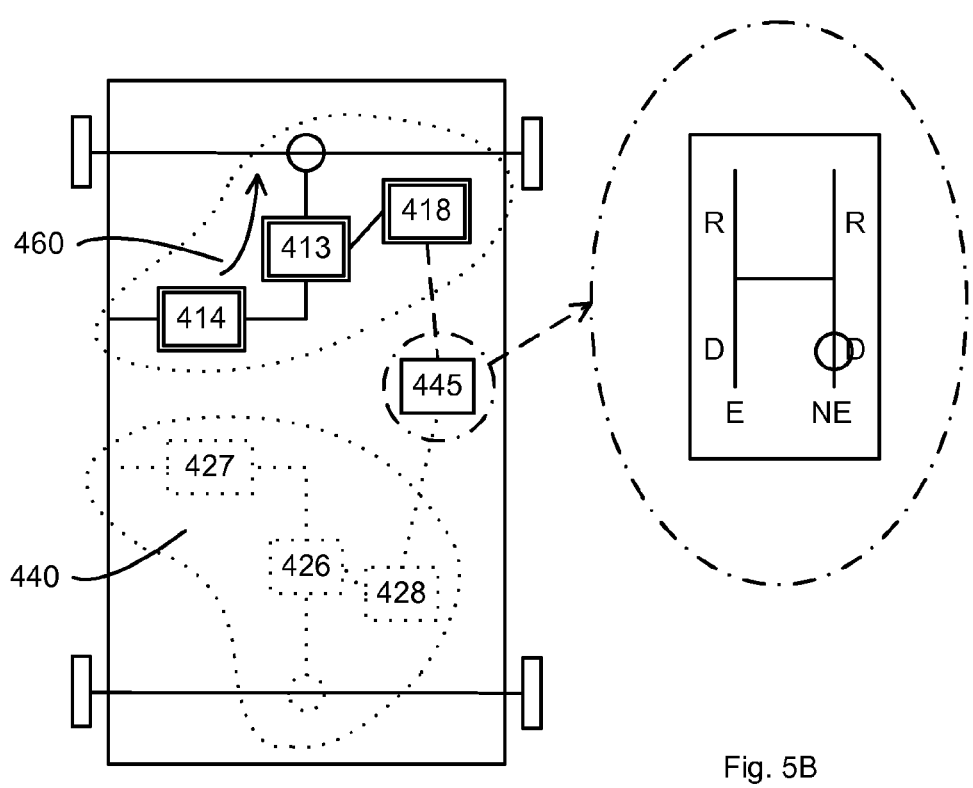

FIGS. 5A-5B illustrates two exclusive modes of operation for the present electric vehicle according to some embodiments of the present invention. When the control 470 is switched to electric drive, the vehicle is powered by the electric motor with the non-electric engine turned off or disengaged (FIG. 5A). When the control 470 is switched to non-electric drive, the vehicle is powered by the non-electric motor with the electric engine turned off or disengaged (FIG. 5B). The mutually exclusive mode of operation can simplify the vehicle requirements, for example, by not needing a synchronization assembly to synchronize the front wheels with the back wheels since these wheels are driven by different power systems.

The non-electric engine is an engine that is not powered by electrical power or by battery power, e.g., a motor, including a gasoline internal combustion engine, a diesel engine, a bio-diesel engine, a hydrogen-powered engine, an ethanol powered engine, a natural-gas powered engine, a fuel-cell engine, a steam engine, a compressed-air engine (e.g., an engine operated by compressed air), a motor powered by a solar panel, or any combination thereof.

One purpose of the non-electric drive assembly 460 is to extend the range of the electric vehicle. A major concern of electric vehicles is the limited range of the battery, together with the limited availability of charging station and the long time needed to fully charge the battery. Thus range extender capabilities could be useful until the electric vehicle technology is mature.

In some embodiments, the non-electric drive assembly 460 is designed to serve as an emergency operation. The emergency operation capability can give the users of electric vehicle some peace of mind, knowing that the electric vehicles won't be stranded in deserted areas. For example, the non-electric drive assembly can comprise a small engine, one that allows emergency operation but not for 100% operation. In some embodiments, the emergency engine can be smaller (either in engine size, power, or speed) as compared to the electric engine or as compared to a conventional gasoline engine. In some embodiments, the emergency engine can offer 30-80% capability of the electric drive system, for example, by providing a vehicle capacity, speed or power of 30-80% of the electric drive system. In some embodiments, the emergency engine offers less than 100%, less than 80%, 50%, or less than 30% of the power or speed of the electric drive. For example, gasoline or diesel engines less than 1 liter, preferably less than 0.75 liter, and more preferably less than 0.5 liter (such as a 350 cc or 250 cc motorcycle engine) can be used in the non-electric drive assembly. The gasoline or diesel engine can comprise 1 cylinder or two cylinders. The small size of engine can reduce the weight and cost of the electric vehicle.

In some embodiments, the non-electric drive assembly 460 is designed to serve for long range operation. A typical battery range is about 100 miles, as compared to a gasoline tank of 400 miles. Thus the non-electric drive assembly can allow the electric vehicle to operate for a longer range without stopping. For example, the electric drive can operate in city streets, and when reaching the highway, the non-electric drive can start.

Figure 6A:
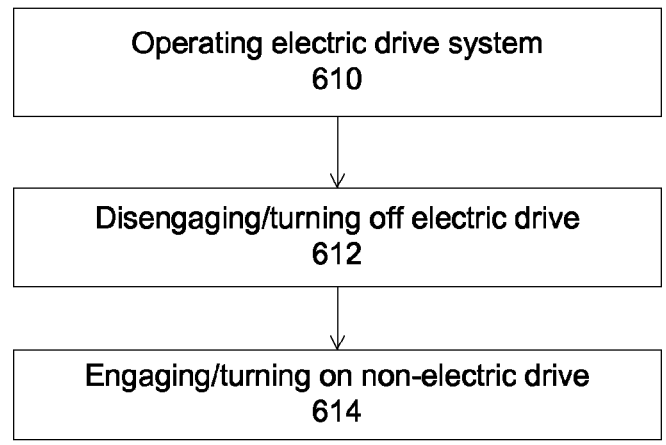
FIGS. 6A-6C illustrate exemplary flowcharts for driving the present electric vehicle according to some embodiments of the present invention.
Figure 6B:
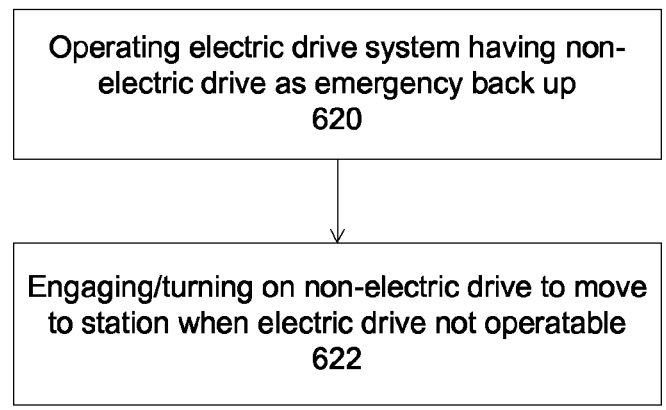
Figure 6C:
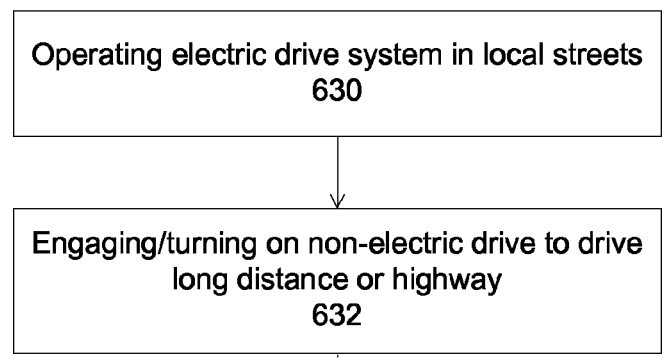

FIGS. 6A-6C illustrate exemplary flowcharts for driving the present electric vehicle according to some embodiments of the present invention. In FIG. 6A, operation 610 provides an operation of an electric vehicle by an electric drive system. Operation 612 disengages or turns off the electric drive. Operation 614 engages or turns on non-electric drive system to move the vehicle, after the electric drive is disengaged or turned off. Reverse operation is also possible, where the non-electric drive is disengaged or turned off before engaging or turning on the electric drive.

In FIG. 6B, operation 620 provides an operation of an electric vehicle by an electric drive system, wherein the electric vehicle comprises a non-electric drive assembly as an emergency back up power train. Operation 622 engages the non-electric power train to move the vehicle, for example, to a battery charging station, when the electric drive system is not capable of moving the vehicle, for example, by running out of battery.

In FIG. 6C, operation 630 provides an operation of an electric vehicle by an electric drive system in local streets. Operation 632 switches from the electric drive to a non-electric drive to drive long distance in highway conditions.

In some embodiments, the electric vehicle further comprises a charging operation when operated by the non-electric drive assembly. For example, the electric motor doubled as a generator, a generator coupled to the axle or to the non-electric drive, or a separately-powered generator can be added to generate electricity to recharge the battery when the non-electric drive assembly is operating.

Figure 7:
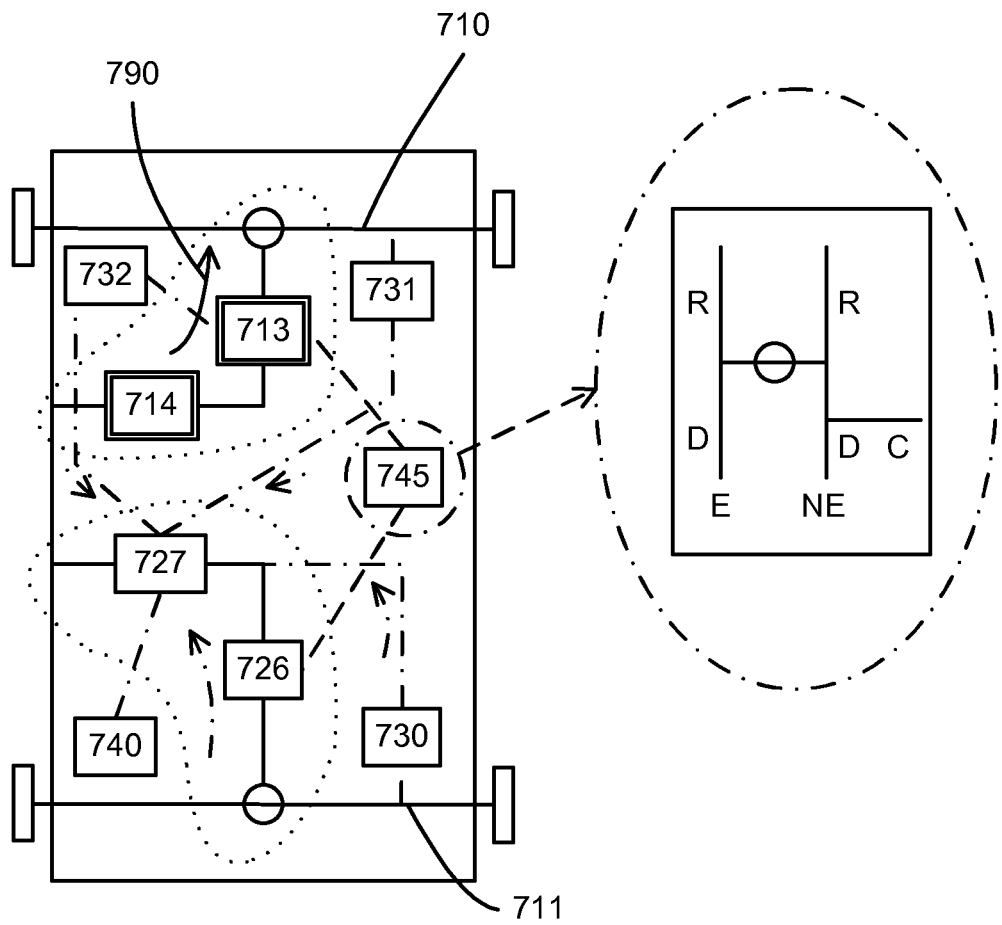
FIG. 7 illustrates exemplary configuration of generator to recharge the battery according to some embodiments of the present invention.

FIG. 7 illustrates exemplary configuration of generator to recharge the battery according to some embodiments of the present invention. When the vehicle is operating under the non-electric power, as shown by arrow 790 showing power going to the non-electric axle 710, the motor 726 can be converted to a generator to recharge the battery 727. Alternatively, a generator 730 or 731 can be coupled to the electric drive axle 711 or 710, respectively, to generate power to charge the battery. Or a generator 732 can be coupled to the non-electric engine 713 to generate power to charge the battery. The generators 726/630/731/732 are powered from the axle, and thus do not need an external power source. Alternatively, a generator 740 received power from the power source 714 of the non-electric drive assembly can be included to charge the battery, with or without any engagement from the electric drive or the non-electric drive systems. The controller 745 can include a control position, for example, C, deviated from the non-electric drive NE to initiate the charging operation. Alternatively, the controller can have a separate control position (not shown) to start the separate generator 740.

In some embodiments, the present electric vehicle can comprise non-electric or non-battery support system, for example, air conditioner, heater, battery charger, fan, electronic support, or lighting. If the support system extracts little power, it can be connected to the battery. If the support system requires a significant amount of power, such as the air conditioner system, a separate non-electric support system with its own power source would help conserve the battery power. For example, an air conditioner running on compressed air can be included to provide the electric vehicle with air conditioner comfort and without interfering with the battery power. The compressed air can be recharged, similar to the battery, when needed. Alternatively, the air conditioner can be powered by a solar panel, or by gasoline powered engine, providing comfort during the heated sun. Other support systems, such as heater, battery charger, fan, electronic support, or lighting can also be powered by non-electric or non-battery power, such as solar panel, compressed air, gasoline, natural, etc.

Figure 8A:
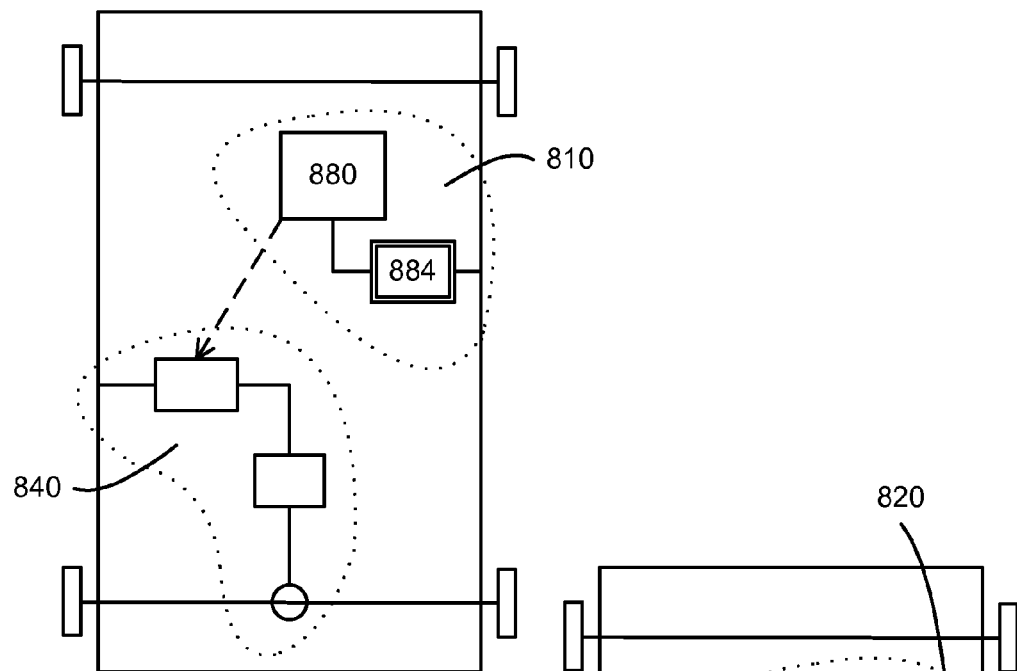
FIGS. 8A-8B illustrate exemplary electric vehicles with non-electric support (including non-battery) system according to some embodiments of the present invention.
Figure 8B:
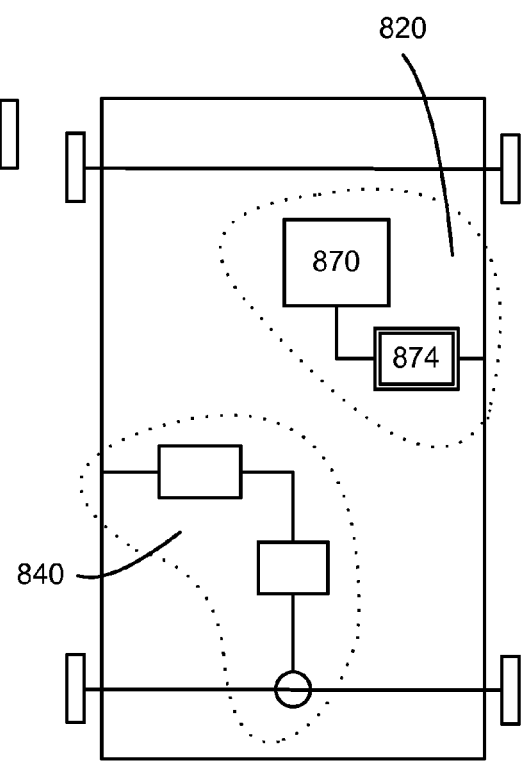

FIGS. 8A-8B illustrate exemplary electric vehicles with non-electric support (including non-battery) system according to some embodiments of the present invention. FIG. 8A shows an electric vehicle comprising an electric drive system 840 driving an axle of the vehicle. Other electric drive system can be used, and other electric drive components can be included, instead of in addition to the system shown. In addition, the electric vehicle further comprises a non-electric (including non-battery) charger system 810 comprising a generator, such as a gasoline-powered generator 880, powering by a separate power source such as a gasoline tank 884. The non-electric charger system 810 can provide emergency power to the battery when the battery is running out, or provide continuous battery charging during long distance travel. The non-electric support system can be used with or without non-electric drive assembly or generator as disclosed above.

The charger system 810 can comprise a solar powered generator, a natural gas powered generator, a compressed air generator, or a generator using any non-battery type of power.

In some embodiments, the vehicle is operated in electric drive mode. In out-of-battery emergency situation, the vehicle is stopped. The non-electric charger system 810 can then be started to charge the battery. Thus the electric vehicle can be restarted after a short time to recharge the battery. Alternatively, the non-electric charger system 810 can be started when the battery power reaches a certain level. This can ensure that the electric vehicle always has electric power to drive. The starting of the non-electric charger system 810 can be automatic or manual.

In some embodiments, the vehicle is operated in electric drive mode, together with the operation of the non-electric charger system 810. For example, in planning a long distance travel, a distance longer than the range of the battery, the electric vehicle can be in charging mode during driving. This can ensure that the battery has enough power to reach the destination without stopping for recharging.

FIG. 8B shows an electric vehicle comprising an electric drive system 840 driving an axle of the vehicle, together with a non-electric support system 820, such as a compressed-air air-conditioner 870, powered by compressed air cylinder 874, included to provide air conditioner comfort to the electric vehicle. The non-electric support system can be used with or without non-electric drive assembly or generator as disclosed above.

The support system 820 can comprise an air conditioner, a heater, a fan, an electronic support, a lighting system, etc., powered by solar panels, natural gas, gasoline, diesel, compressed air, or any non-battery type of power.

In some embodiments, the vehicle is operated by the electric drive to drive the vehicle. The non-electric support system can be operated to provide support functions to the vehicle, either when the vehicle is running or when the vehicle is not running. For example, the air-conditioner can be turned on or off depending on the need of the user, regardless of the conditions of the electric drive system.

In this description, the term "vehicle" or other similar term is meant to be a motor vehicle, such as a passenger automobile, a sports utility vehicle (SUV), a bus, a truck, or any other types of automobiles.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that is has the full scope defined by the language of the following claims, and equivalents thereof.

What is claimed is:

1. An electric vehicle comprising
a first drive system configured to drive a first wheel of the electric vehicle, wherein the first drive system comprises a battery powering an electric motor;
a second drive system configured to drive a second wheel of the electric vehicle, wherein the second drive system is powered by a non-battery power source;
wherein the first wheel is coupled to a first axle, wherein the second wheel is coupled to a second axle wherein the first axle is different from the second axle;
a manual controller operated by a driver of the electric vehicle,
wherein the manual controller is configured to provide a mutually exclusive operation of the first and the second drive systems,
wherein the manual controller is configured to exclude operations in which the first and the second drive systems operate simultaneously.

2. An electric vehicle as in claim 1 further comprising
a capability of charging the battery of the first drive system when the second drive is engaged with the second wheel.

3. An electric vehicle as in claim 1
wherein the manual controller comprises a first drive setting, a second drive setting, a first reverse setting, and a second reverse setting,
wherein in the first drive setting, the first drive system is engaged with the first wheel and the second drive system is disengaged from the second wheel,
wherein in the second drive setting, the second drive system is engaged with the second wheel and the first drive system is disengaged from the first wheel,
wherein in the first drive setting, the first drive system drives the first wheel to move the electric vehicle forward,
wherein in the second drive setting, the second drive system drives the second wheel to move the electric vehicle forward,
wherein in the first reverse setting, the first drive system drives the first wheel to move the electric vehicle backward,
wherein in the second reverse setting, the second drive system drives the second wheel to move the electric vehicle backward.

4. An electric vehicle as in claim 1 wherein the manual controller comprises
a charge setting, wherein in the charge setting, the second drive system charges the battery while driving the second wheel.

5. An electric vehicle as in claim 1 wherein at least one of the first axle consists of only the first wheel, or the second axle consists of only the second wheel.

6. An electric vehicle as in claim 1 wherein
there are one or more wheels coupled to the first axle, in addition to the first wheel, or
there are one or more wheels coupled to the second axle, in addition to the second wheel.

7. An electric vehicle as in claim 1 wherein
there is at least one more wheel coupled to the first axle and the first drive is configured to drive only the first wheel, or
there is at least one more wheel coupled to the second axle and the second drive is configured to drive only the second wheel.

8. An electric vehicle as in claim 1 wherein
there is at least one more first wheel coupled to the first axle and the first drive is also configured to drive the at least one more first wheel, or
there is at least one more second wheel coupled to the second axle and the second drive is also configured to drive the at least one more second wheel.

9. An electric vehicle as in claim 1 wherein
there are one or more first wheels coupled to the first axle and the first drive is configured to drive more than one wheel of the one or more first wheels, or
there are one or more second wheels coupled to the second axle and the second drive is configured to drive more than one wheel of the one or more second wheels.

10. An electric vehicle comprising
a first drive system configured to drive a first axle of the electric vehicle, wherein the first drive system comprises a battery powering an electric motor;
a second drive system configured to drive a second axle of the electric vehicle, wherein the second drive system is powered by a non-battery power source;
a manual controller operated by a driver of the electric vehicle,
wherein the manual controller is configured to provide a mutually exclusive operation of the first and the second drive systems,
wherein the manual controller is configured to exclude operations in which the first and the second drive systems operate simultaneously.

11. An electric vehicle as in claim 10 further comprising
a generator for charging the battery of the first drive system by the second drive system.

12. An electric vehicle as in claim 10
wherein the manual controller comprises a first drive setting, a second drive setting, a first reverse setting, and a second reverse setting,
wherein in the first drive setting, the first drive system is engaged with the first wheel and the second drive system is disengaged from the second wheel,
wherein in the second drive setting, the second drive system is engaged with the second wheel and the first drive system is disengaged from the first wheel,
wherein in the first drive setting, the first drive system drives the first wheel to move the electric vehicle forward,
wherein in the second drive setting, the second drive system drives the second wheel to move the electric vehicle forward,
wherein in the first reverse setting, the first drive system drives the first wheel to move the electric vehicle backward,
wherein in the second reverse setting, the second drive system drives the second wheel to move the electric vehicle backward.

13. An electric vehicle as in claim 10 further comprising a sensor to inform the driver of the conditions of the vehicle.

14. An electric vehicle as in claim 10 wherein at least one of
the first axle comprises only one first wheel, or
the second axle comprises only one second wheel.

15. An electric vehicle as in claim 10 wherein
there are one or more wheels coupled to the first axle, or
there are one or more wheels coupled to the second axle.

16. An electric vehicle comprising
a first wheel coupled to a first axle;
a second wheel coupled to a second axle;
a first drive system configured to drive the first wheel or the first axle of the electric vehicle, wherein the first drive system comprises a battery powering an electric motor;
a second drive system configured to drive the second wheel or the second axle of the electric vehicle, wherein the second drive system is powered by a non-battery power source;
a manual controller operated by a driver of the electric vehicle,
wherein the manual controller is configured to provide a mutually exclusive operation of the first and the second drive systems,
wherein the manual controller is configured to exclude operations in which the first and the second drive systems operate simultaneously.

17. An electric vehicle as in claim 16 wherein at least one of
the first axle consists of only the first wheel, or
the second axle consists of only the second wheel.

18. An electric vehicle as in claim 16 wherein
there are one or more wheels coupled to the first axle, in addition to the first wheel, or
there are one or more wheels coupled to the second axle, in addition to the second wheel.

19. An electric vehicle as in claim 16 wherein
there are one or more first wheels coupled to the first axle and the first drive is configured to drive only one wheel of the one or more first wheels, or
there are one or more second wheels coupled to the second axle and the second drive is configured to drive only one wheel of the one or more second wheels.

20. An electric vehicle as in claim 16 wherein
there are one or more first wheels coupled to the first axle and the first drive is configured to drive the first axle, or
there are one or more second wheels coupled to the second axle and the second drive is configured to drive the second axle.

* * * * *